(12) United States Patent
Wu

(10) Patent No.: US 6,497,417 B2
(45) Date of Patent: Dec. 24, 2002

(54) COLLET CHUCK PROVIDED WITH A DRIVEN MOVABLE MEMBER WHICH CAN BE DRIVEN HYDRAULICALLY IN TWO OPPOSITE DIRECTIONS FOR OPERATING A COLLET

(76) Inventor: Hsuan-Lung Wu, No. 4-6, Le-Tien Lane, Fang-Shu Li, Nan-Tun Dist., Taichung City (TW)

( * ) Notice: Subject to any disclaimer, the term of this patent is extended or adjusted under 35 U.S.C. 154(b) by 93 days.

(21) Appl. No.: 09/752,776

(22) Filed: Jan. 3, 2001

(65) Prior Publication Data
US 2002/0053771 A1 May 9, 2002

(30) Foreign Application Priority Data
Oct. 25, 2000 (TW) ..................... 89218568 U

(51) Int. Cl.[7] .............................. B23B 31/20
(52) U.S. Cl. ............... 279/4.08; 279/4.09; 279/50; 279/51
(58) Field of Search ............... 279/4.07–4.09, 279/50, 51, 58

(56) References Cited

U.S. PATENT DOCUMENTS

| | | | | |
|---|---|---|---|---|
| 2,372,592 A | * | 3/1945 | Lovely | 279/4.09 |
| 2,387,511 A | * | 10/1945 | Henry et al. | 279/51 |
| 2,418,082 A | * | 3/1947 | Marasko | 279/4.09 |
| 3,073,612 A | * | 1/1963 | Birdsall | 279/4.09 |
| 4,690,415 A | * | 9/1987 | Holdridge | 279/4.09 |
| 6,173,971 B1 | * | 1/2001 | Shen | 279/4.08 |

* cited by examiner

*Primary Examiner*—Steven C. Bishop
(74) *Attorney, Agent, or Firm*—Pillsbury Winthrop, LLP

(57) ABSTRACT

A collet chuck includes a tubular body and a rotating shaft assembly that is journalled within the tubular body and that defines a frustoconical recess therewithin. A belt pulley is sleeved fixedly on the rotating shaft assembly. A collet is disposed operably within the recess in the rotating shaft assembly, and is adapted to hold a rod-shaped workpiece therewithin. A movable member is mounted axially and movably within the tubular body for movement in tightening and loosening directions. A front oil chamber is formed in the tubular body, and is located immediately in front of the movable member. A rear oil chamber is formed in the tubular body, and is located immediately behind the movable member. A first oil passage is formed in the tubular body and is in fluid communication with the front oil chamber so that hydraulic oil can be fed thereinto, thereby moving the movable member within the tubular body in the tightening direction so as to compress the collet. A second oil passage is formed in the tubular body and is in fluid communication with the rear oil chamber so that hydraulic oil can be fed to thereinto, thereby moving the movable member within the tubular body in the loosening direction so as to release the collet.

3 Claims, 5 Drawing Sheets

COLLET CHUCK PROVIDED WITH A DRIVEN MOVABLE MEMBER WHICH CAN BE DRIVEN HYDRAULICALLY IN TWO OPPOSITE DIRECTIONS FOR OPERATING A COLLET

BACKGROUND OF THE INVENTION

1. Field of the Invention

The invention relates to a collet chuck, more particularly to a collet chuck provided with a movable member which can be driven hydraulically in two opposite directions for operating a collet.

2. Description of the Related Art

Referring to FIGS. 1 and 2, a conventional collet chuck is shown to include a tubular body 11, a rotating shaft 14 journalled in the tubular body 11 and provided with a frustoconical recess 162, and a collet 12 disposed operably within the frustoconical recess 162 in the rotating shaft 14 for holding a rod-shaped workpiece (A) therewithin.

As illustrated, the tubular body 11 includes a hollow main body with open front and rear ends. A tubular shaft seat 13 is confined within the tubular body 11, and defines front and rear bearing-retention recesses 131 at opposite ends thereof. Two ball bearings 18 are disposed in the bearing-retention recesses 131 in the shaft seat 13 to permit rotation of the rotating shaft 14 within the shaft seat 13. A front cover 121 is disposed fixedly on the front end of the tubular body 11 to prevent removal of the rotating shaft 14 from the tubular body 11. A rear cover 17 is disposed fixedly on the open rear end of the tubular body 11, and has a plurality of bolt holes. The fastener bolts 172 extends respectively through the bolt holes in the rear cover 17 to engage threaded holes in the rotating shaft 14, thereby preventing removal of the rotating shaft 14 from the tubular body 11. A belt pulley 173 is sleeved fixedly on the rear cover 17. The rotating shaft 14 consists of an inner sleeve 16 in which the frustoconical recess 162 is formed, and an outer sleeve 141 sleeved fixedly on the inner sleeve 16 so as to define an accommodating chamber 142 therebetween at a rear end thereof. The front cover 121 has an inner surface which is formed with a driving shoulder (121S) that abuts against a driven shoulder (12S) of the collet 12. A tubular movable member 15 is mounted axially, movably and sealingly within the accommodating chamber 142 in the outer sleeve 141 and is further fastened securely to the inner sleeve 16. A plurality of spring-retention elements 174 position a compression spring unit 175 between the rear cover 17 and the rotating shaft 14 in such a manner that the spring unit 175 biases the movable member 15 in a forward direction such that the inner sleeve 16 moves synchronously with the movable member 15. Under this condition, when the rod-shaped workpiece (A) is inserted into the collet 12, and when the front cover 121 is tightened, the workpiece (A) will be compressed radially by the collet 12 due to relative sliding movement between inclined surfaces 162',123 of the inner sleeve 16 and the collet 12, as best shown in FIG. 1.

The tubular body 11 further has an oil chamber 153 that is located immediately in front of the movable member 15. Two oil passages 143, 132 are in fluid communication with the oil chamber 153. When it is desired to release the workpiece (A) from the collet 12, hydraulic oil can be fed to the oil chamber 153 via the oil passages 143,132, thereby compressing the spring unit 175 within the tubular body 11 and consequently moving the movable member 15 and the inner sleeve 16 in a forward direction away from the frustoconical recess 162, as shown by the horizontal arrows in FIG. 2, so as to release the workpiece (A) from the collet 12.

Some disadvantages that result from the use of the aforesaid conventional collet chuck are as follows:

The clamping force of the collet 12 depends entirely on the spring unit 175 and cannot be adjusted. In addition, the spring 175 suffers from spring fatigue after long term use, thereby resulting in an eventual poor clamping effect of the collet 12.

SUMMARY OF THE INVENTION

Therefore, the object of this invention is to provide a collet chuck having a movable member which can be driven hydraulically in two opposite directions for operating a collet, thereby enabling the collet to provide an effective clamping force on a workpiece.

Accordingly, a collet chuck of the present invention includes a tubular body, a rotating shaft assembly, a belt pulley, a collet, and a movable member. The tubular body has a front end and a rear end. The rotating shaft assembly is journalled within the tubular body, and has a frustoconical recess. The belt pulley is sleeved fixedly on the rotating shaft assembly. The collet is disposed operably within the frustoconical recess in the rotating shaft assembly, and is adapted to hold a rod-shaped workpiece therewithin. The movable member is mounted axially and movably within the tubular body in such a manner so as to be movable in a selected one of a tightening direction and a loosening direction. A front oil chamber is formed in the tubular body, and is located immediately in front of the movable member. A rear oil chamber is formed in the tubular body, and is located immediately behind the movable member. A first oil passage is formed in the tubular body, and is in fluid communication with the front oil chamber so that hydraulic oil can be fed to the front oil chamber therethrough, thereby moving the movable member rearward within the tubular body. A second oil passage is formed in the tubular body, and is in fluid communication with the rear oil chamber so that hydraulic oil can be fed to the rear oil chamber therethrough, thereby moving the movable member forward within the tubular body. Movement of the movable member in the tightening direction results in further movement of the collet into the frustoconical recess in the rotating shaft assembly for compressing the collet. Movement of the movable member in the loosening direction results in movement of the collet away from the frustoconical recess in the rotating shaft assembly so as to be adapted to release the workpiece from the collet.

BRIEF DESCRIPTION OF THE DRAWINGS

Other features and advantages of this invention will become more apparent in the following detailed description of preferred embodiments of this invention, with reference to the accompanying drawings, in which.

DETAILED DESCRIPTION OF THE PREFERRED EMBODIMENTS

Figure 1:
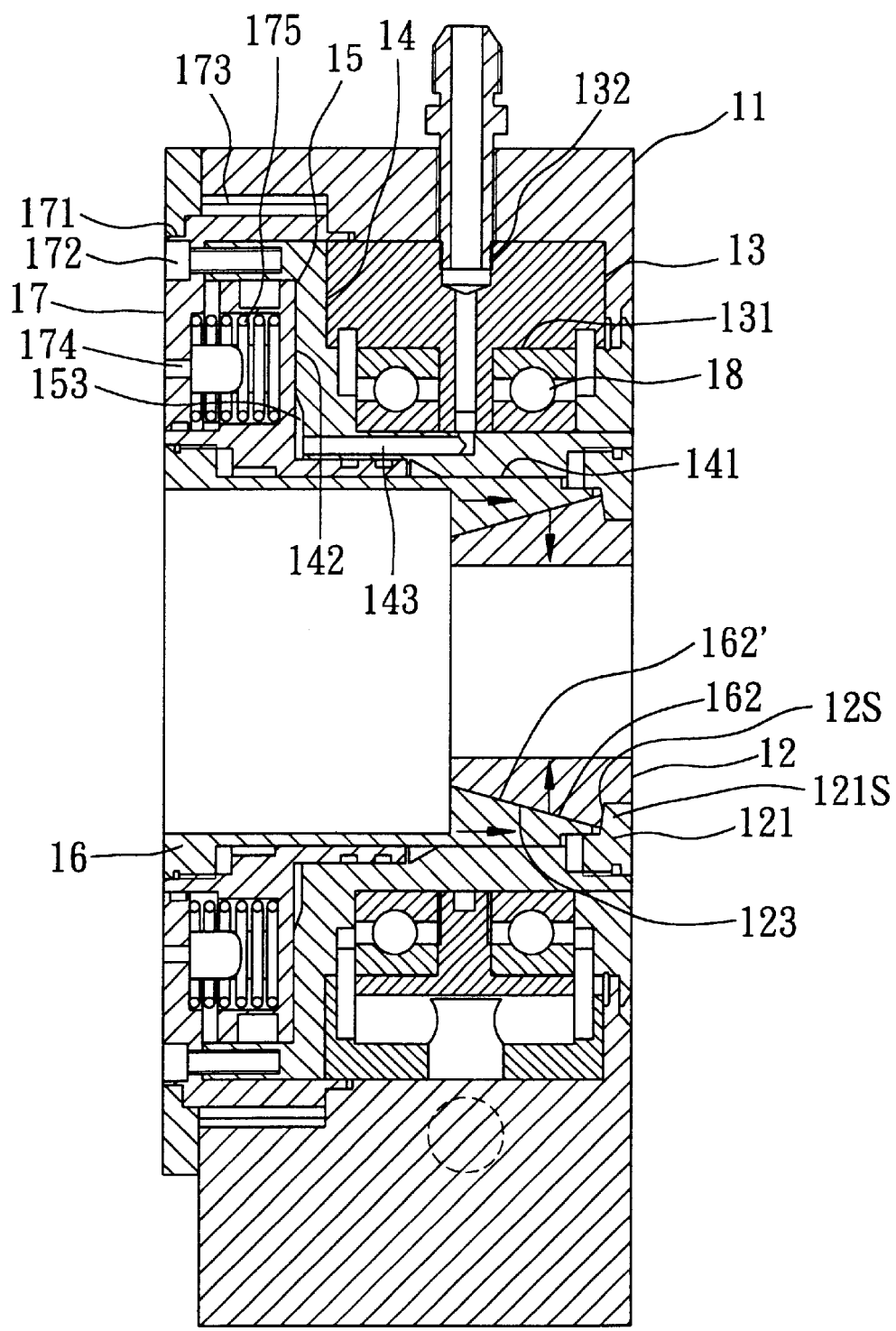
FIG. 1 is a sectional view of a conventional collet chuck, illustrating how an inner sleeve is biased to compress a collet.
Figure 2:
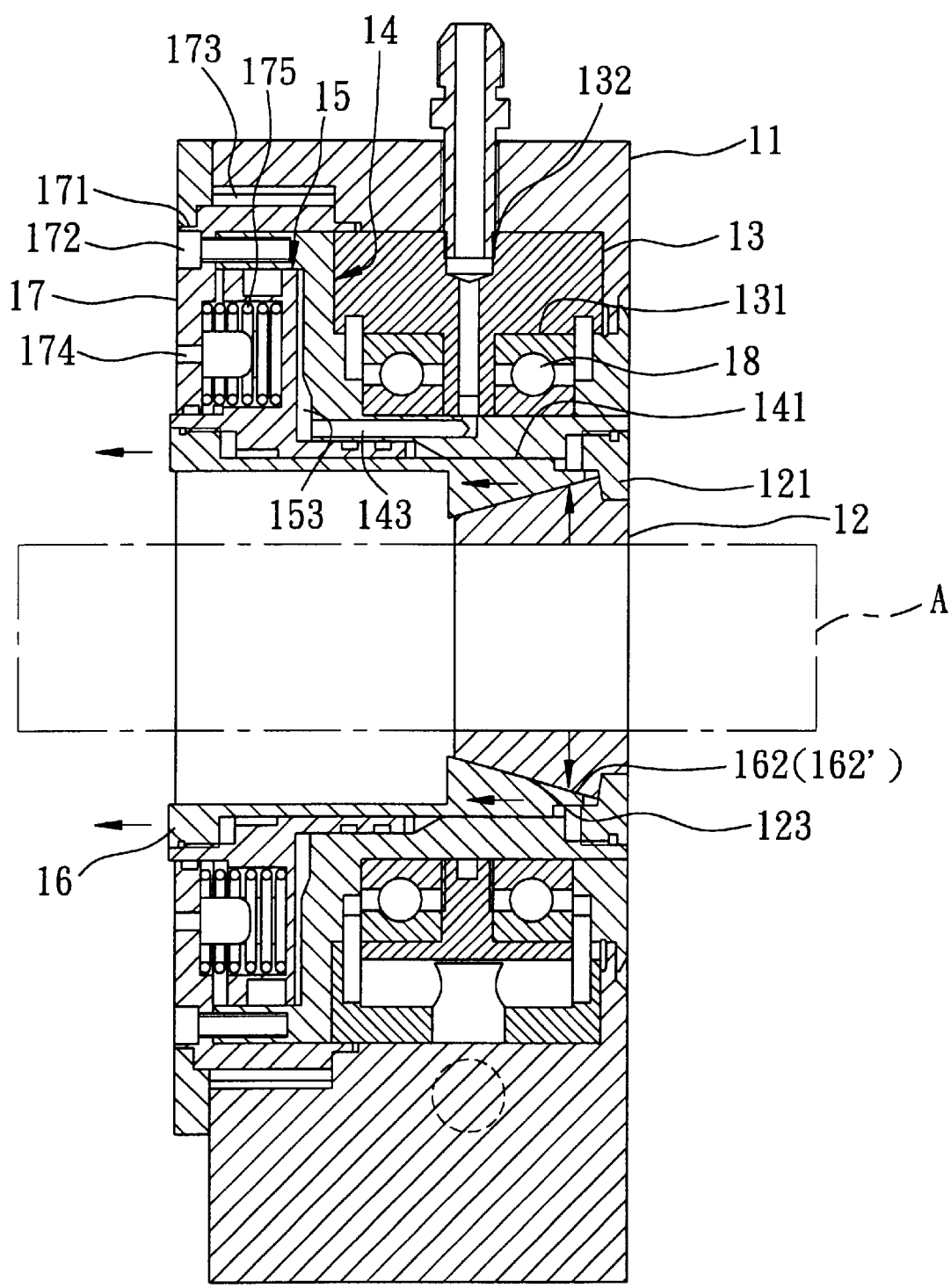
FIG. 2 is a sectional view of the conventional collet chuck, illustrating how the inner sleeve moves within a tubular body in order to release a rod-shaped workpiece therefrom.

Before the present invention is described in greater detail with reference to the following preferred embodiments, it should be noted that same reference numerals have been used to denote similar elements throughout the specification.

Figure 3:
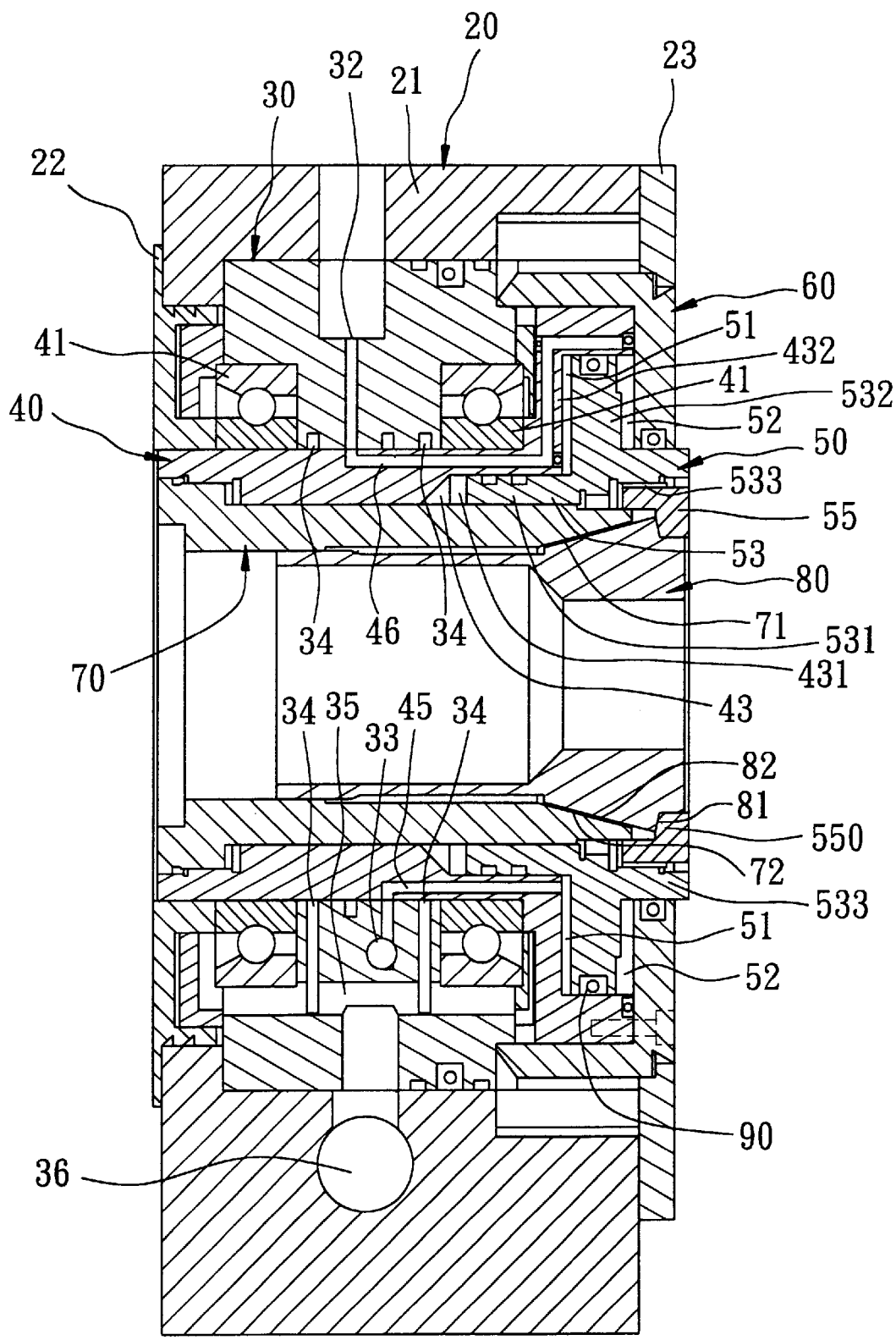
FIG. 3 is a sectional view of the first preferred embodiment of a collet chuck of the present invention, illustrating an interior configuration thereof.
Figure 4:
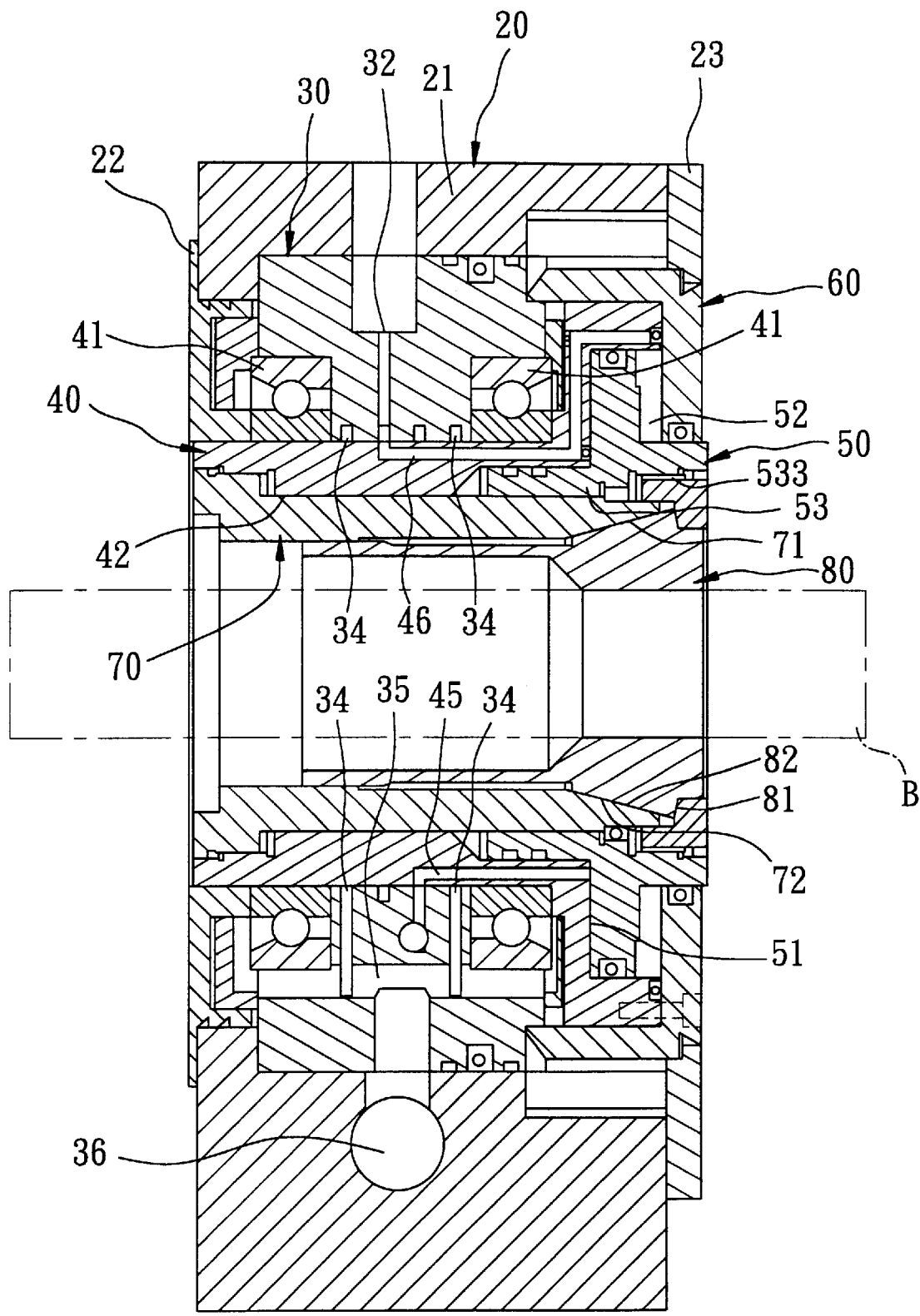
FIG. 4 is a sectional view of the first preferred embodiment, illustrating how a collet moves within a tubular body in order to hold a rod-shaped workpiece therein.

Referring to FIGS. 3 and 4, the first preferred embodiment of a collet chuck of the present invention is shown to include a tubular body 20, a rotating shaft assembly 40, a belt pulley 60, a collet 80, and a movable member 50.

As illustrated, the tubular body 20 has a front end and a rear end.

The rotating shaft assembly 40 is journalled within the tubular body 20, and defines a frustoconical recess 71 therewithin.

The belt pulley 60 is sleeved fixedly on the rotating shaft assembly 40 for rotating the shaft assembly 40.

The collet 80 is disposed operably within the frustoconical recess 71 in the rotating shaft assembly 40, and is adapted to hold a rod-shaped workpiece (B) therewithin. An outer surface of the collet 80 is formed with a driven shoulder 81.

The movable member 50 is mounted axially and movably within the tubular body 20, and is movable within the tubular body 20 in a selected one of a tightening direction and a loosening direction relative to the workpiece (B). As to how the working piece (B) is tightened or loosened by the collet 80, this will be described in greater detail in the succeeding paragraphs.

A front oil chamber 51 is formed in the tubular body 20, and is located immediately in front of the movable member 50.

A rear oil chamber 52 is formed in the tubular body 20, and is located immediately behind the movable member 50.

A first oil passage 45 is formed in the tubular body 20, and is in fluid communication with the front oil chamber 51 so that when hydraulic oil is fed into the front oil chamber 51, the movable member 50 moves in a rearward direction within the tubular body 20.

A second oil passage 46 is formed in the tubular body 20, and is in fluid communication with the rear oil chamber 52 so that when hydraulic oil is fed into the rear oil chamber 52, the movable member 50 moves in a forward direction within the tubular body 20.

Movement of the movable member 50 in the forward or tightening direction, results in further movement of the collet 80 into the frustoconical recess 71 in the rotating shaft assembly 40 for compressing the collet 80. Movement of the movable member 50 in the rearward or loosening direction, away from the frustoconical recess 71 in the rotating shaft assembly 40 releases the workpiece (B) from the collet 80.

The tubular body 20 includes a hollow main body 21 which has open front and rear ends. A tubular shaft seat 30 is confined within the main body 21, and defines annular front and rear bearing-receiving recesses. Two ball bearings 41 are mounted in the bearing-receiving recesses in the shaft seat 30, and are interposed between the shaft seat 30 and the rotating shaft assembly 40 to permit rotation of the latter within the shaft seat 30. An annular front cover 22 is threaded to the front end of the main body 21 to prevent removal of the rotating shaft assembly 40 from the main body 21 therethrough. An annular rear cover 23 is disposed fixedly on the rear end of the main body 21 to prevent removal of the rotating shaft assembly 40 from the main body 21 thereothrough. The main body 21 further has a plurality of annular oil chambers 34 between the ball bearings 41 and two connecting passages 35,36 for connecting fluidly the oil chambers 34.

The rotating shaft assembly 40 includes an inner sleeve 70 and an outer sleeve 42. The frustoconical recess 71 is formed in an end of the inner sleeve 70. The inner sleeve 70 has an inclined inner surface 72 that slidably abuts against an inclined outer surface 82 of the collet 80. The outer sleeve 42 is sleeved fixedly on the inner sleeve 70 so as to define an accommodating chamber 43 therebetween at the rear end thereof. The chamber 43 has an annular inner section 431, and an annular outer section 432 that is communicated with the inner section 431 and that has an outer diameter greater than that of the inner section 431. The outer sleeve 42 cooperates with the tubular shaft seat 30 to define two radial fluid passages 33, 32 via which the fluid is introduced into the first and second oil passages 45,46.

The movable member 50 preferably consists of a tubular insert element 53 and an externally threaded retaining ring 55. The tubular insert element 53 is disposed within the chamber 43 of the outer sleeve 42, and is further sleeved axially and movably on the inner sleeve 70 of the rotating shaft assembly 40. The insert element 53 has a small-diameter inner tube portion 531 which is inserted into the inner section 431 of the accommodating chamber 43 in the rotating shaft assembly 40 and which has an outer diameter that is slightly smaller than that of the inner section 431, a large-diameter intermediate tube portion 532 which is disposed within the outer section 432 of the accommodating chamber 43 and which has an outer diameter larger than that of the inner section 431 of the accommodating chamber 43 in such a manner that a liquid-tight seal 90 is established between the intermediate tube portion 532 of the insert element 53 and the outer sleeve 42, and an internally threaded outer tube portion 533. The retaining ring 55 engages threadedly the outer tube portion 533 of the insert element 53, and has an inner surface which is formed with a driving shoulder 550 that abuts against the driven shoulder 81 of the collet 80 for moving the collet 80 inwardly within the main body 21 when the tubular insert element 53 moves in the tightening or forward direction.

Figure 5:
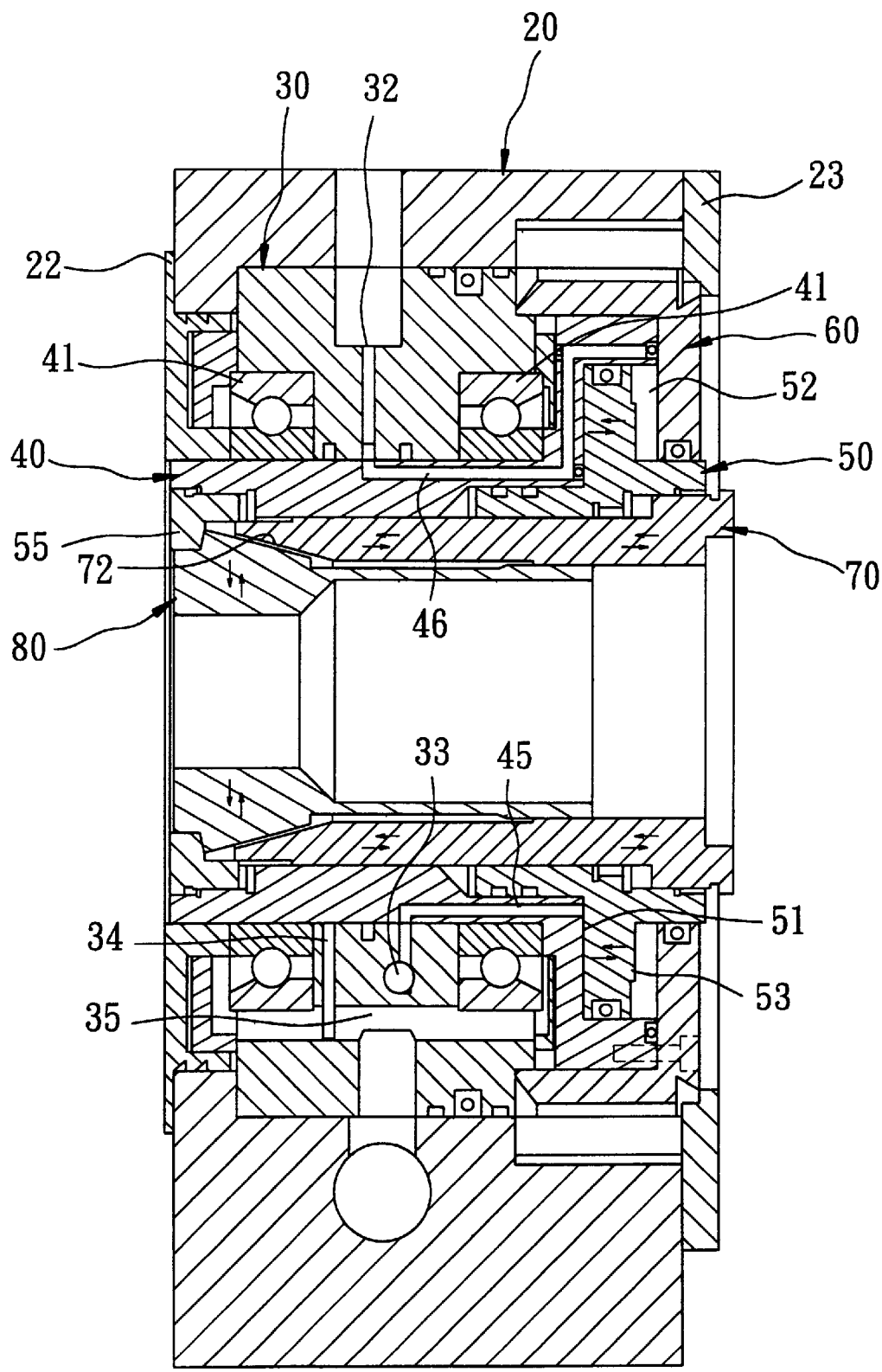
FIG. 5 is a sectional view of the second preferred embodiment of a collet chuck of the present invention, illustrating an interior configuration thereof.

Referring to FIG. 5, a second preferred embodiment of the present invention is shown to have a structure substantially similar to that of the first preferred embodiment, the main difference residing in that the movable member 50 is sleeved fixedly on the inner sleeve 70. The inner sleeve 70 can move forwardly with the movable member 50 to compress the collet 80.

Since the collet 80 of the collet chuck of the present invention is moved by the hydralically driven tubular insert element 53 in the tightening and loosening directions, the collet 80 can grip effectively the workpiece once the latter is disposed therewithin. In addition, the flow of fluid into the front and rear oil chambers 51, 52 can be controlled to adjust the clamping force of the collet 80 with respect to the workpiece. The object of the invention is thus achieved.

With this invention thus explained, it is apparent that numerous modifications and variations can be made without departing from the scope and spirit of this invention. It is therefore intended that this invention be limited only as indicated in the appended claims.

I claim:

1. A collet chuck comprising:

a tubular body having a front end and a rear end;

a rotating shaft assembly journalled within said tubular body, and including an outer sleeve and an inner sleeve that defines a frustoconical recess, said outer sleeve being sleeved fixedly on said inner sleeve;

a belt pulley sleeved fixedly on said rotating shaft assembly;

a collet disposed operably within said frustoconical recess in said inner sleeve and adapted to hold a rod-shaped workpiece therewithin;

a movable member mounted axially and movably within said tubular body and movable within said tubular body in a selected one of a tightening direction and a loosening direction; and two ball bearings disposed between said tubular body and said outer sleeve so as to facilitate rotation of said rotating shaft assembly within said tubular body, said ball bearings being spaced apart from said inner sleeve so as to prevent said movable member from contact with said ball bearings during movement of said movable member in said tubular body;

said tubular body further having a front oil chamber formed between said inner and outer sleeves and located immediately in front of said movable member, a rear oil chamber formed between said inner and outer sleeves and located immediately behind said movable member, a first oil passage formed in an assembly of said outer sleeve and said tubular body and in fluid communication with said front oil chamber so that hydraulic oil can be fed to said front oil chamber therethrough, thereby moving said movable member rearward within said tubular body, and a second oil passage formed in the assembly of said outer sleeve and said tubular body and in fluid communication with said rear oil chamber so that hydraulic oil can be fed to said rear oil chamber therethrough, thereby moving said movable member forward within said tubular body;

wherein movement of said movable member in said tightening direction is one of forward and rearward movements of said movable member within said tubular body and results in further movement of said collet into said frustoconical recess in said inner sleeve for compressing said collet, and wherein movement of said movable member in said loosening direction is the other one of said forward and rearward movements of said movable member and results in movement of said collet away from said frustoconical recess in said inner sleeve so as to be adapted to release the workpiece from said collet.

2. The collet chuck as defined in claim 1, wherein said tubular body includes:

a hollow main body having an open front end and an open rear end;

a tubular shaft seat fixed within said main body;

said ball bearings being interposed between said shaft seat and said rotating shaft assembly, thereby permitting rotation of said rotating shaft assembly within said shaft seat;

a front cover disposed fixedly on said front end of said main body, thereby preventing removal of said rotating shaft assembly from said main body through said front end of said main body; and a rear cover disposed fixedly on said open rear end of said main body, thereby preventing removal of said rotating shaft assembly from said main body through said rear end of said main body.

3. The collet chuck as defined in claim 1, wherein said inner and outer sleeves define an accommodating chamber therebetween, which has an annular inner section, and an annular outer section that is communicated with said inner section and that has an outer diameter greater than that of said inner section;

said collet having an outer surface that is formed with a driven shoulder;

said movable member including:

a tubular insert element sleeved axially and movably on said inner sleeve of said rotating shaft assembly and having a small-diameter inner tube portion which is inserted into said inner section of said accommodating chamber in said rotating shaft assembly and which has an outer diameter that is slightly smaller than that of said inner section, a large-diameter intermediate tube portion which is disposed within said outer section of said accommodating chamber and which has an outer diameter larger than that of said inner section of said accommodating chamber in such a manner that a liquid-tight seal is established between said intermediate tube portion and said outer sleeve, and an internally threaded outer tube portion; and an externally threaded retaining ring engaging threadedly said internally threaded outer tube portion of said insert element, and having an inner surface which is formed with a driving shoulder that abuts against said driven shoulder of said collet for moving said collet inwardly within said tubular body when said movable member moves in said tightening direction.

* * * * *